United States Patent [19]

Roder et al.

[11] 3,920,682

[45] Nov. 18, 1975

[54] BENZIMIDAZOLE-1-CARBOXYLIC ACID AMIDES

[75] Inventors: Kurt Roder; Reinhold Puttner; Ernst-A. Pieroh, all of Berlin, Germany

[73] Assignee: Schering AG, Berlin, Germany

[22] Filed: Sept. 6, 1974

[21] Appl. No.: 503,807

[30] Foreign Application Priority Data

Sept. 17, 1974 Germany............................ 2347386

[52] U.S. Cl............................. 260/309.2; 424/273
[51] Int. Cl.²..............C07D 235/32; C07D 307/32; C07D 333/36
[58] Field of Search.................................. 260/309.2

[56] References Cited
UNITED STATES PATENTS

| | | | |
|---|---|---|---|
| 3,631,176 | 12/1971 | Klopping.......................... | 260/309.2 |
| 3,660,421 | 5/1972 | Osieka et al...................... | 260/309.2 |
| 3,692,783 | 9/1972 | Baker................................ | 260/309.2 |
| 3,751,425 | 8/1973 | Osieka et al..................... | 260/309.2 |

FOREIGN PATENTS OR APPLICATIONS

| | | | |
|---|---|---|---|
| 2,048,150 | 3/1971 | France............................. | 260/309.2 |
| 2,060,230 | 8/1971 | France............................. | 260/309.2 |
| 2,061,876 | 6/1971 | France............................. | 260/309.2 |
| 2,067,436 | 8/1971 | France............................. | 260/309.2 |

*Primary Examiner*—Natalie Trousof
*Attorney, Agent, or Firm*—Joseph F. Padlon

[57] ABSTRACT

Benzimidazole-1-carboxylic acid amides and their method of production are provided for use per se or in fungicidal combinations.

8 Claims, No Drawings

BENZIMIDAZOLE-1-CARBOXYLIC ACID AMIDES

The invention relates to new benzimidazole-1-carboxylic acid amides, to methods for the production of these compounds, and to fungicides containing these compounds as active substances.

The fungicidal effect of benzimidazole derivatives is known in the art. One of their most important representatives is methyl-1-(butylcarbamoyl)-2-benzimidazole carbamate (Cf. French Pat. No. 1,523,597) already introduced in the practice for the control of phytopathogenic fungi. While this active substance has a broad spectrum of action, it does not always meet the stipulated requirements, in particular with respect to the systemic and prophylactic control of injurious fungi in agricultural and other cultivations.

This problem is solved according to the invention by an agent which is characterized by a content of at least one compound of the general formula

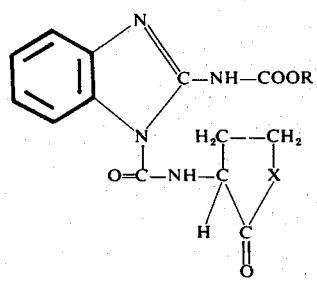

in which

R is an aliphatic hydrocarbon radical with 1 to 4 carbon atoms, and

X is oxygen or sulfur.

The aliphatic hydrocarbon radical designated as radical R in the general formula includes methyl, ethyl, propyl, isopropyl, n-butyl, secondary butyl and allyl; compounds with R meaning methyl, ethyl and isopropyl being especially outstanding for their fungicidal effect.

The compounds of the invention possess superior fungicidal properties. Thus they show a good fungicidal action against such fungi as Rhizoctonia, Fusarium, True mildew fungi, Piricularia, Botrytis and Fusacladium.

As the compounds are non-toxic and excellently fruit- and plant-compatible, they can be used, among others, in viniculture, horticulture and in the cultivation of ornamentals, as well as in numerous crop plant cultivations, such as cotton, rice and others.

The compounds of the invention have the special advantage of being not only prophylactic but also curative, so that established noxious fungi, such as Erysiphaceae, Venturia and Piricularia, cannot develop or thrive.

Moreover, these compounds exert a systemic effect, in that they are conducted to the site of action in the sap stream of the plants. The absorption of the compounds then takes place, not only via the leaves, but also from the soil via the roots.

The compounds of the invention can therefore be used, for example, as sprays or disinfectants in agriculture as well as horticulture and the like, for the fungicidal treatment of infected or infection-endangered plants and soils or for the protection of seed.

The application can be effected either with an active substance alone or with mixtures of at least two active substances of different constitution from the group of the claimed compounds. If desired, other fungicides, nematocides, herbicides or other pest control agents can be added according to the desired purpose. Expediently the active substances are employed in the form of preparations, adding liquid and/or solid vehicles or diluents and also wetting agents, adhesives, emulsifiers and/or dispersing aids.

Suitable liquid vehicles are water, mineral oils, or other organic solvents, such as chylene, chlorobenzene, cyclohexanol, cyclohexanone, dioxane, acetonitrile, acetic ester, dimethyl formamide, isophorone and dimethyl sulfoxide.

As solid vehicles are suitable lime, kaoline, chalk, talc, attaclay and other clays as well as natural or synthetic silicic acid.

Among the surface-active substances there should be included: salts of lignin-sulfonic acids, salts of alkylated benzenesulfonic acids, sulfonated acid amides and their salts, polyethoxylated amines and alcohols.

If the active substances are to be used for seed disinfection, dyes may be admixed in order to give the disinfected seed material a clearly visible coloration.

The proportion of the active substance(s) in the agent may vary in wide limits, the exact concentration of the active substance used for the agents depending mainly on the quantity in which the agents are to be used, among others, for soil and seed treatment or for foliage spraying. For example, the agents contain between about 1 to 80 per cent by weight, preferably between 20 and 50 per cent by weight of active substance and about 99 to 20 per cent by weight of liquid or solid vehicles and optionally up to 20 per cent by weight of surface-active substances.

The new compounds of general formula (I) can be produced by reacting compounds of the general formula

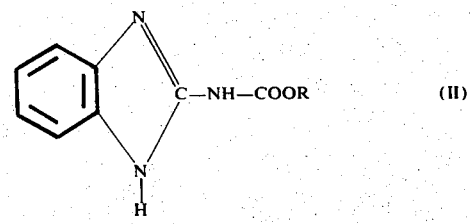

with α-isocyanato-γ-butyrolactone or α-isocyanato-γ-thiole-butyrolactone of the formula

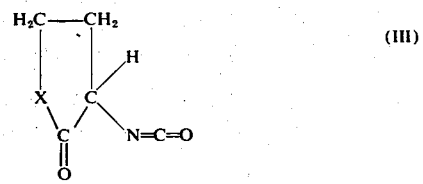

expediently in equimolecular quantity ratios in the presence of an inert organic solvent, R and X having the above stated meaning.

Inert organic solvents suitable for the reaction are chloroform, tetrahydrofurane and methylene chloride. The products of the method are formed in very good yield and purity and are isolated in a manner known in itself.

The following examples will explain the production of the compounds according to the invention.

1.
2-(Methoxycarbonylamino)-benzimidazole-1-carboxylic acid-(2-oxyperhydro-3-furanylamide)

To a suspension of 5.37 g (0.03 mole) of 2-(methoxycarbonylamino)-benzimidazole in 300 ml chloroform a solution of 3.81 g (0.03 mole) of α-isocyanato-γ-butyrolactone in 20 ml chloroform is added in drops at 20° while stirring. The reaction mixture is stirred at room temperature for another hour and then filtered. The clear filtrate is concentrated to dryness under vacuum. The colorless crystalline residue is digested with ether.

Yield: 9.4 g = 98% of the theory.
M.p.: 172°–174°C (decomposition).

Analogously also the following compounds of the invention can be produced. 2-(Ethoxycarbonylamino)-benzimidazole-1-carboxylic acid-(2-oxoperhydro-3-furanylamide), m.p.: 147°C (decomposition). 2-(Isopropoxycarbonylamino)-benzimidazole-1-carboxylic acid-(2-oxoperhydro-3-furanylamide), m.p.: 154°–155°C (decomposition).

2.
2-(Methoxycarbonylamino)-benzimidazole-1-carboxylic acid-(2-oxyperhydro-3-thienylamide)

To a suspension of 5.73 g (0.03 mole) of 2-(methoxycarbonylamino)-benzimidazole in 300 ml of chloroform is added in drops a solution of 4.49 g (0.03 mole) of α-isocyanato-γ-thiobutyrolactone in 20 ml chloroform while stirring at 20°. The reaction mixture is stirred at room temperature for another hour and then filtered. The clear filtrate is concentrated to dryness under vacuum. The colorless crystalline residue is digested with ether.

Yield: 9.3 g = 93% of the theory.
M.p.: 140°C (decomposition).

Analogously also the following compounds according to the invention can be produced:

3.
2-(Ethoxycarbonylamino)-benzimidazole-1-carboxylic acid-(2-oxoperhydro-3-thienylamide), m.p.: 125°C (decomposition).

2-(Isopropoxycarbonylamino)-benzimidazole-1-carboxylic acid-(2-oxoperhydro-3-thienylamide), m.p.: 110°C (decomposition). 2-(Butoxycarbonylamino)-benzimidazole-1-carboxylic acid-(2-oxoperhydro-3-thienylamide), m.p.: 105°C (decomposition).

The compounds according to the invention have the following characteristics: They are colorless and odorless crystalline substances. They are insoluble in water and benzine and more or less soluble in chloroform, dimethyl formamide, dimethyl sulfoxide and acetone.

The starting products for the production of the compounds according to the invention are known or can be produced by known methods.

The fungicidal effect of the compounds of the invention in comparison with known agents will be evident from the following examples.

Example 1

The fungicidal effect of the compounds of the invention was tested on phytopathogenic fungi on artificial culture media in Petri dishes (agar impregnation test). A culture medium consisting of 2% malt extract and 1.5% agar-agar powder was sterilized and before solidification thoroughly mixed with the compounds to be tested, so that the medium contained the active substances listed in the table in the different quantities of 9, 3 and 1 ppm, respectively. After solidification of the medium, the latter was inoculated with a platinum dropper containing about 100 spores of the fungus to be tested. After exposure for 5 to 10 days at 22°C, the diameter of the fungus colonies in mm was measured. The diameter of the colonies on untreated culture media (control) was taken as 100. The diameter of the colonies on the treated culture media was stated in relation to the control (relative percentage).

| Compounds according to the invention | Diameter of the fungus colonies in mm (relative per cent at control=100) | | | | | | | | |
|---|---|---|---|---|---|---|---|---|---|
| | Botrytis cinerea | | | Colletotrichum gloeosporioides | | | Penicillum species | | |
| | 9 ppm | 3 ppm | 1 ppm | 9 ppm | 3 ppm | 1 ppm | 9 ppm | 3 ppm | 1 ppm |
| 1. 2-(Methoxycarbonylamino)-benzimidazole-1-carboxylic acid-(2-oxoperhydro-3-furanylamide) | — | 0 | 13 | — | 0 | 0 | — | 0 | 0 |
| 2. 2-(Methoxycarbonylamino)-benzimidazole-1-carboxylic acid-(2-oxoperhydro-3-thienylamide) | — | 0 | 11 | — | 0 | 0 | — | 0 | 0 |
| Comparison Agent | | | | | | | | | |
| 3. N-(trichloromethylthio)-phthalimide | 0 | 3 | 72 | 0 | 0 | 78 | 20 | 79 | 88 |
| Control (untreated) | | 100 | | | 100 | | | 100 | |

Example 2

Young pumpkins with fully developed cotyledons were placed in aqueous suspensions of 40 ppm each of the substance to be tested. The young plants stood in the suspension only so deep that the roots and at most a 5 mm long piece of the stem (hypocotyl) were in the liquid. After 24 hours the plants were taken out of the suspensions, rinsed, and externally sterilized. From the upper end of the hypocotyl - directly under the attachment of the cotyledons - a piece of stem about 3 mm long was cut out. The total length of the hypocotyl was about 50 mm. The stem pieces were placed in sterile Petri dishes with the cut surface on a malt extract agar, which had been well mixed with spores of Botrytis cinerea before solidification. Two days after the laying out of the stem pieces, the inhibition halos around the stem pieces (no growth of Botrytis) were determined as to their diameter. The size of the inhibition halos represents the rate of conductivity and the intensity of the effect.

the removed wheat grains was rated. The growth of the spores in the holes after removal of the treated grains was stated in relation to the control.

| Compounds according to the invention | | % spore germination at | | | |
|---|---|---|---|---|---|
| | | 100 | 50 | 25 | 12.5 ppm |
| 1. | 2-(Methoxycarbonylamino)-benzimidazole-1-carboxylic acid-(2-oxoperhydro-3-furanylamide) | 0 | 0.2 | 1.2 | 6 |
| 2. | 2-(Isopropoxycarnylamino)-benzimidazole-1-carboxylic acid-(2-oxoperhydro-3-furanylamide) | 4 | 5 | 8 | 20 |
| 3. | 2-(Metoxycarbonylamino)-benzimidazole-1-carboxylic acid-(2-oxoperhydro-3-thienylamide) | 0 | 0.2 | 2 | 5 |
| | Comparison Agent | | | | |
| 4. | Methoxyethyl-Hg-silicate | 20 | — | — | — |
| | Control (untreated) | | 100 | | |

| Compounds according to the invention | Diameter of the inhibition halos in mm after 24 hours exposure time of 40 ppm |
|---|---|
| 1. 2-(Methoxycarbonylamino)-benzimidazole-1-carboxylic acid-(2-oxoperhydro-3-furanylamide) | 23 |
| 2. 2-(Isopropoxycarbonylamino)-benzimidazole-1-carboxylic acid-(2-oxo-perhydro-3-furanylamide) | 14 |
| Comparison Agent | |
| 3. Methyl-1-(butylcarbamoyl)-2-benzimidazolecarbamate | 11 |
| Control (untreated) | 0 |

Example 3

Wheat grains artificially contaminated with 3 g spores of Tilletia caries per kg of wheat were thoroughly mixed with the compounds listed in the table in quantities of 100 to 12.5 ppm. To obtain a uniform distribution of the active substance on the grain, the compounds to be tested were provided with the usual additions, such as kaolin, talc, chalk, dye, oil, etc. After the treatment, the disinfected and non-disinfected grains were inserted half way into a slurried loam and kept at 10°C. After 6 days the grains were removed. On the 10th day the germination of the spores in the holes of

Example 4

Rye seed naturally infected with *Fusarium nivale* was thoroughly mixed with the compounds to be tested. To obtain a uniform distribution of the active substance on the grain, the compounds to be tested were provided with the usual additions, such as kaolin, talc, chalk, dye, oil, etc. Then the seed was placed in earth and exposed to a temperature of 6° to 12°C in an air conditioned chamber. After about 4 weeks the percentual infection of the plants was determined. The infection of the control was taken as 100. The infection of the plants after treatment of the seed with the tested compounds was stated in relation to the control.

| a) | Compounds according to the invention | % infection at | | |
|---|---|---|---|---|
| | | 50 | 20 | 10 ppm |
| 1. | 2-(Methoxycarbonylamino)-benzimidazole-1-carboxylic acid-(2-oxoperhydro-3-furanylamide) | 0 | 1 | 90 |
| 2. | 2-(Isopropoxycarbonylamino)-benzimidazole-1-carboxylic acid-(2-oxoperhydro-3-furanylamide) | 0 | 1 | 92 |
| | Comparison Agent | | | |
| 3. | Methoxyethyl-Hg-silicate | 6 | 46 | — |
| | Control (untreated) | | 100 | |

| b) | Compounds according to the invention | % infection at | | |
|---|---|---|---|---|
| | | 3 | 2 | 1 ppm |
| 1. | 2-(Methoxycarbonylamino)-benzimidazole-1-carboxylic acid-(2-oxoperhydro-3-furanylamide) | 0 | 0 | 2 |
| 2. | 2-(Methoxycarbonylamino)-benzimidazole-1-carboxylic acid-(2-oxoperhydro-3-thienylamide) | 0 | 0 | 1 |
| | Comparision Agent | | | |
| 3. | Methoxyethyl-Hg-silicate | 125 | 50 | 25 |

| a) Compounds according to the invention | % infection at 50 20 10 ppm |
|---|---|
| Control (untreated) | 100 |

Example 5

Oat seed artificially contaminated with *Ustilago avenae* was thoroughly mixed with the substance to be tested. To obtain a uniform distribution of the active substance on the grain, the compounds to be tested were provided with the usual additions such as kaolin, talc, chalk, dye, oil, etc. Then the seed was placed in earth and was grown in a greenhouse. After the panicles appeared, the percentual infection of the oat plants was determined. The infection of the control was taken as 100. The infection in the plants of the tested compounds was stated in relation to the control.

| Compound according to the invention | % infection at 500 250 100 ppm | | |
|---|---|---|---|
| 1. 2-(Methoxycarbonylamino)-benzimidazole-1-carboxylic acid-(2-oxoperhydro-3-furanylamide) | 0 | 10 | 58 |
| Comparison agent | | | |
| 2. Methoxyethyl-Hg-silicate | 188 | 125 | 50 |
| Control (untreated) | | 100 | |

Example 6

Young plants of *Vicia faba* were thoroughly sprayed with 100 ppm of the compounds to be tested. After the spraying coating had dried on, the leaflets of the plants were inoculated. The inoculated sections were 5 mm in diameter. They were picked out from a Petri dish overgrown with *Pellicularia sasakii*. The plants were then set up in an infection chamber at 27°C and 95–100% rel. humidity. After 4–5 days the percentual degree of infection of the inoculated leaves was evaluated. The infection of the unsprayed leaves was evaluated. The infection of the unsprayed leaves (control) was taken as 100. The infection of the leaves with the tested compounds was stated in relation to the control.

| Compounds according to the invention | % infection at 500 100 ppm | |
|---|---|---|
| 1. 2-(Methoxycaronlyamino)-benzimidazole-1-carboxylic acid-(2-oxoperhydro-3-furanylamide) | 0 | 0 |
| 2. 2-(Isopropoxycarbonylamino)-benzimidazole-1-carboxylic acid-(2-oxoperhydro-3-furanylamide) | 4 | 10 |
| 3. 2-(Methoxycarbonylamino)-benzimidazole-1-carboxylic acid-(2-oxoperhydro-3-thienylamide) | 0.7 | — |
| Comparison Agent | | |
| 4. Methyl-1-(butylcarbamoyl)-2-benzimidazole carbamate | 5 | 8 |
| Control (untreated) | 100 | |

Example 7

Young plants of *Vicia faba* were thoroughly sprayed with the compounds to be tested. After the spray coating had dried on, the plants were infected with a spore suspension of *Botrytis fabae* and set in an infection chamber at 25°C and 95–100% rel. humidity. After 2 days the percentual infection of the plants was rated. The infection of the control plants was taken as 100. The infection in the plants of the tested compounds was stated in relation to the control.

| Compound according to the invention | % of infection with 25 2.5 ppm | |
|---|---|---|
| 1. 2-(Methoxycarbonylamino)-benzimidazole-1-carboxylic acid-(2-oxoperhydro-3-furanylamide) | 8 | 52 |
| Comparison agent | | |
| 2. N-(trichloromethylthio)-phthalimide | 17 | 69 |
| Control (untreated) | 100 | |

Example 8

Young plants of sugar beets (*Beta vulgaris*) were thoroughly sprayed with the compounds to be tested in concentrations of 50 and 2.5 ppm, respectively. After the spray coating has dried on, the plants were infected with a spore suspension of *Cercospora beticola* and set up for 48 hours in infection chambers of 25°–27°C and 95–100% rel. humidity. After that they stood in the greenhouse at about 25°C until appearance of leaf spots. In the evaluation of the percentual infection, the infection of the control was taken as 100. The infection of the treated leaves was stated in relation to the control.

| Compounds according to the invention | % infection at | |
|---|---|---|
| | 50 | 2.5 ppm |
| 1. 2-(Methoxycarbonylamino)-benzimidazole-1-carboxylic acid-(2-oxoperhydro-3-furanylamide) | 6 | 6 |
| 2. 2-(Isopropoxycarbonylamino)-benzimidazole-1-carboxylic acid-(2-oxoperhydro-3-furanylamide) | 0 | 17 |
| 3. 2-(Methoxycarbonylamino)-benzimidazole-1-carboxylic acid-(2-oxoperhydro-3-thienylamide) | 0 | 0.8 |
| Comparison agent | | |
| 4. Manganese-ethylene-1,2-bisdithiocarbamate | 15 | 67 |
| Control (untreated) | | 100 |

Example 9

Steamed compost soil was inoculated with mycelium of *Rhizoctonia solani*. After homogenous mixing of the preparations with the infected soil - the preparations were present as 20-percentual powders - 25 grains of marrow peas of the variety "Miracle of Kelvedon" per concentration were seeded without waiting period in clay dishes holding 1 liter of soil. In the table are stated the number of germinated sound peas, the weight of the fresh plant, and a root rating after a cultivation time of 3 weeks at 22°–25°C.

Root score:

4 = white roots, without fungus necrosis
3 = white roots, slight fungus necrosis
2 = brown roots, relatively severe fungus necrosis
1 = severe fungus necrosis, roots rotted.

| | Compounds according to the invention | mg active substance per liter soil | Number of sound peas after 3 weeks | Weight of fresh plant (g) | Root Score (1–4) |
|---|---|---|---|---|---|
| 1. | 2-(Methoxycarbonylamino)-benzimidazole-1-carboxylic acid-(2-oxoperhydro-3-furanylamide) | 10 mg | 6 | 5 g | 1 |
| | | 20 mg | 23 | 20 g | 4 |
| | | 30 mg | 24 | 19 g | 4 |
| 2. | 2-(Ethoxycarbonylamino)-benzimidazole-1-carboxylic acid-(2-oxoperhydro-3-furanylamide) | 10 mg | 18 | 13 g | 2 |
| | | 20 mg | 23 | 19 g | 4 |
| | | 30 mg | 23 | 19 g | 4 |
| 3. | 2-(Isopropoxycarbonylamino)-benzimidazole-1-carboxylic acid-(2-oxoperhydro-3-furanylamide) | 10 mg | 11 | 10 g | 3 |
| | | 20 mg | 25 | 19 g | 4 |
| | | 30 mg | 22 | 20 g | 4 |
| 4. | 2-(Methoxycarbonylamino)-benzimidazole-1-carboxylic acid-(2-oxoperhydro-3-thienylamide) | 10 mg | 8 | 6 g | 2 |
| | | 20 mg | 18 | 15 g | 4 |
| | | 30 mg | 23 | 17 g | 4 |
| 5. | 2-(Ethoxycarbonylamino)-benzimidazole-1-carboxylic acid-(2-oxoperhydro-3-thienylamide) | 10 mg | 22 | 13 g | 4 |
| | | 20 mg | 22 | 15 g | 4 |
| | | 30 mg | 21 | 15 g | 4 |
| 6. | 2-(Butoxycarbonylamino)-benzimidazole-1-carboxylic acid-(2-oxoperhydro-3-thienylamide) | 10 mg | 10 | 6 g | 1 |
| | | 20 mg | 24 | 18 g | 4 |
| | | 30 mg | 24 | 17 g | 4 |
| | Comparison Agent | mg active substance per liter soil | Number of sound peas after 3 weeks | Weight of fresh plant (g) | Root Score (1–4) |
| 7. | 1,4-Dichloro-2,5-dimethoxybenzene | 10 mg | 0 | 0 g | 1 |
| | | 20 mg | 0 | 0 g | 1 |
| | | 30 mg | 21 | 18 g | 4 |
| | Pentachloronitrobenzene | 50 mg | 4 | 4 g | 1 |
| | | 100 mg | 25 | 15 g | 4 |
| | Steamed soil | — | 21 | 18 g | 4 |
| | Untreated soil | — | 4 | 4 g | 1 |

Example 10

Steamed compost soil was inoculated with mycelium of *Fusarium oxysporum f. callistephi*. After homogenous mixing of the preparations with the infected soil - the preparations were present as 20-percentual powders - 6 seedlings of *Callistephus chinensis*, master aster "Solar Ray" per concentration were set out as host plants, without waiting period. The table states the number of infected plants after a cultivation time of 5 weeks at a temperature of 22°–25°C.

| Compounds according to the invention | mg active substance per liter soil | Number of infected plants after 5 weeks |
|---|---|---|
| 1. 2-(Methoxycarbonylamino)-benzimidazole-1-carboxylic acid-(2-oxoperhydro-3-furanylamide) | 30 mg | 1 |
| 2. 2-(Ethoxycarbonylamino)-benzimidazole-1-carboxylic acid-(2-oxoperhydro-3-furanylamide) | 30 mg | 0 |
| 3. 2-(Methoxycarbonylamino)-benzimidazole-1-carboxylic acid-(2-oxoperhydro-3-thienylamide) | 30 mg | 0 |
| 4. 2-(Ethoxycarbonylamino)-benzimidazole-1-carboxylic acid-(2-oxoperhydro-3-thienylamide) | 30 mg | 1 |
| 5. 2-(Butoxycarbonylamino)-benzimidazole-1-carboxylic acid-(2-oxoperhydro-3-thienylamide) | 30 mg | 1 |
| Comparison Agent | mg active substance per liter soil | Number of infected plants after 5 weeks |
| 6. Methyl-1-(butylcarbamoyl)-2-benzimidazole carbamate | 30 mg | 3 |
| Steamed soil | — | 0 |
| Untreated soil | — | 6 |

I claim:
1. A benzimidazole-1-carboxylic acid amide of the formula

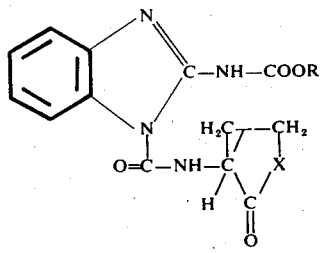

in which
R is an alkyl radical with 1 to 4 carbon atoms, and
X oxygen or sulfur.

2. A compound of the formula as set forth in claim 1, which is 2-(methoxycarbonylamino)-benzimidazole-1-carboxylic acid-(2-oxoperhydro-3-furanylamide).

3. A compound of the formula as set forth in claim 1, which is 2-(ethoxycarbonylamino)-benzimidazole-1-carboxylic acid-(2-oxoperhydro-3-furanylamide).

4. A compound of the formula as set forth in claim 1, which is 2-(isopropoxycarbonylamino)-benzimidazole-1-carboxylic acid-(2-oxoperhydro-3-furanylamide).

5. A compound of the formula as set forth in claim 1, which is 2-(methoxycarbonylamino)-benzimidazole-1-carboxylic acid-(2-oxoperhydro-3-thienylamide).

6. A compound of the formula as set forth in claim 1, which is 2-(ethoxycarbonylamino)-benzimidazole-1-carboxylic acid-(2-oxoperhydro-3-thienylamide).

7. A compound of the formula as set forth in claim 1, which is 2-(isopropoxycarbonylamino)-benzimidazole-1-carboxylic acid-(2-oxoperhydro-3-thienylamide).

8. A compound of the formula as set forth in claim 1, which is 2-(butoxycarbonylamino)-benzimidazole-1-carboxylic acid-(2-oxoperhydro-3-thienylamide).

* * * * *